(12) United States Patent
Kunoike et al.

(10) Patent No.: US 10,103,370 B2
(45) Date of Patent: Oct. 16, 2018

(54) SEALED BATTERY

(71) Applicant: SANYO Electric Co., Ltd., Daito-shi, Osaka (JP)

(72) Inventors: Naoto Kunoike, Osaka (JP); Kyosuke Miyata, Osaka (JP)

(73) Assignee: SANYO Electric Co., Ltd., Daito-shi, Osaka (JP)

( * ) Notice: Subject to any disclaimer, the term of this patent is extended or adjusted under 35 U.S.C. 154(b) by 0 days.

(21) Appl. No.: 14/763,175

(22) PCT Filed: Jan. 30, 2014

(86) PCT No.: PCT/JP2014/000472
§ 371 (c)(1),
(2) Date: Jul. 24, 2015

(87) PCT Pub. No.: WO2014/119309
PCT Pub. Date: Aug. 7, 2014

(65) Prior Publication Data
US 2015/0364734 A1    Dec. 17, 2015

(30) Foreign Application Priority Data

Jan. 31, 2013 (JP) ................................. 2013-017322

(51) Int. Cl.
*H01M 2/12* (2006.01)
*H01M 2/04* (2006.01)
(Continued)

(52) U.S. Cl.
CPC ....... *H01M 2/1241* (2013.01); *H01M 2/0413* (2013.01); *H01M 2/345* (2013.01);
(Continued)

(58) Field of Classification Search
CPC .. H01M 2/1241; H01M 2/0413; H01M 4/525; H01M 2/043; H01M 10/0525
See application file for complete search history.

(56) References Cited

U.S. PATENT DOCUMENTS 6,265,096 B1 * 7/2001 Tucholski ............. H01M 2/023
429/171
6,300,004 B1 * 10/2001 Tucholski ............. H01M 2/023
429/163
(Continued)

FOREIGN PATENT DOCUMENTS

JP  8-31397 A  2/1996
JP  9-120811 A  5/1997
(Continued)

OTHER PUBLICATIONS

International Search Report dated Mar. 25, 2014, issued in counterpart International Application No. PCT/JP2014/000472 (2 pages).

*Primary Examiner* — Jonathan Crepeau
*Assistant Examiner* — Angela Martin
(74) *Attorney, Agent, or Firm* — Westerman, Hattori, Daniels & Adrian, LLP

(57) ABSTRACT

A sealed battery including a bottomed cylindrical outer can having an opening, the opening and a sealing body being crimp-sealed with an insulating gasket interposed therebetween, is disclosed. The sealing body includes a first plate-shaped member and a second plate-shaped member bonded to a surface of the first plate-shaped member, the surface facing the outside of the battery. At least the first plate-shaped member is crimp-sealed at an outer periphery thereof, and the crimp-sealed plate-shaped member has a thin portion on at least one surface thereof, the thin portion serving as a starting point of deformation of the sealing body when a battery internal pressure increases. When the battery internal pressure increases, the sealing body is deformed so (Continued)

that a gap is formed between the insulating gasket and the sealing body and gas in the outer can is vented to the outside of the outer can.

7 Claims, 9 Drawing Sheets

(51) Int. Cl.
    *H01M 4/52*          (2010.01)
    *H01M 10/05*        (2010.01)
    *H01M 4/525*        (2010.01)
    *H01M 2/34*         (2006.01)
    *H01M 10/0525*     (2010.01)

(52) U.S. Cl.
    CPC ....... *H01M 4/525* (2013.01); *H01M 10/0525* (2013.01); *H01M 2/043* (2013.01); *H01M 2200/20* (2013.01)

(56) References Cited

U.S. PATENT DOCUMENTS

| | | | | |
|---|---|---|---|---|
| 6,410,186 B1 * | 6/2002 | Tucholski | ............. | H01M 2/023 429/171 |
| 6,413,668 B1 * | 7/2002 | Sandberg | ............ | H01M 2/0207 429/166 |
| 2004/0094741 A1 * | 5/2004 | Sato | ....................... | C07C 217/08 252/1 |
| 2008/0226982 A1 * | 9/2008 | Schubert | .................. | C09K 3/10 429/185 |
| 2009/0208839 A1 * | 8/2009 | Geng | ..................... | B82Y 30/00 429/206 |
| 2010/0248014 A1 * | 9/2010 | Huang | ................ | H01M 2/0413 429/174 |
| 2010/0304214 A1 * | 12/2010 | Itoh | ......................... | H01M 2/08 429/185 |

FOREIGN PATENT DOCUMENTS

| | | |
|---|---|---|
| JP | 11-111244 A | 4/1999 |
| JP | 2002-208391 A | 7/2002 |
| JP | 2003-109556 A | 4/2003 |
| JP | 2004-335287 A | 11/2004 |
| JP | 2010-287567 A | 12/2010 |

* cited by examiner

Figure 4
(a)
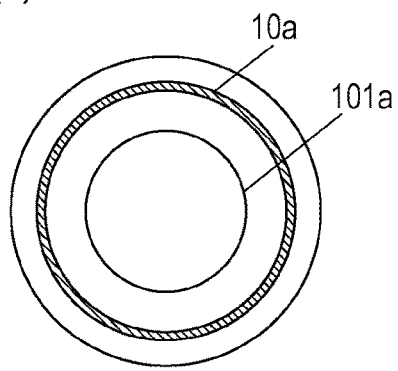
(b)
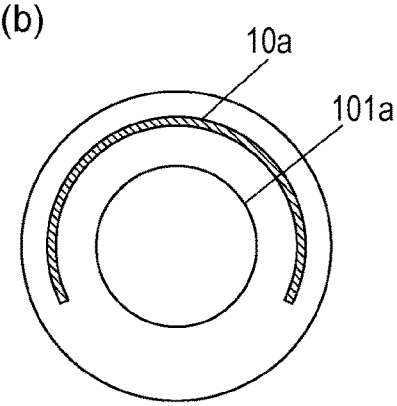
(c)
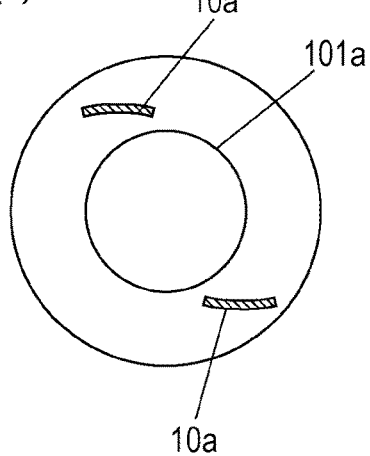
(d)
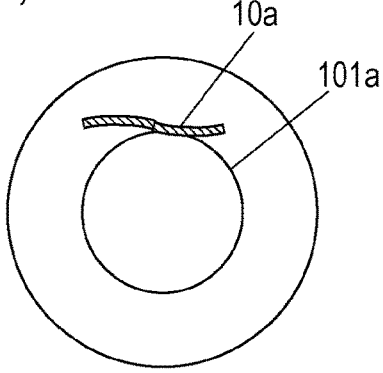

Figure 6
(a)
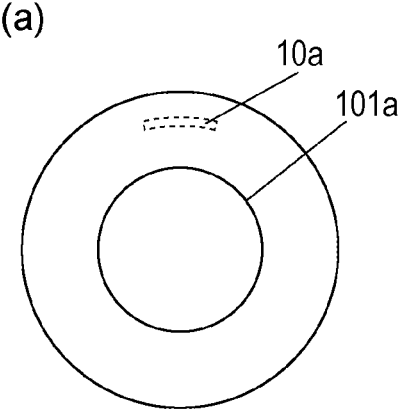
(b)
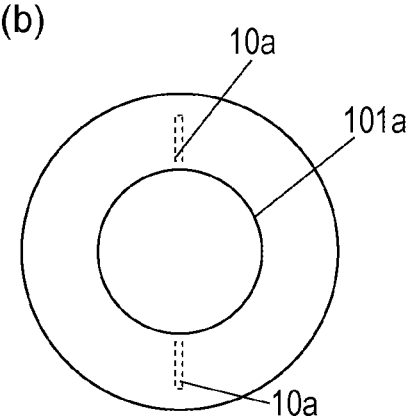
(c)
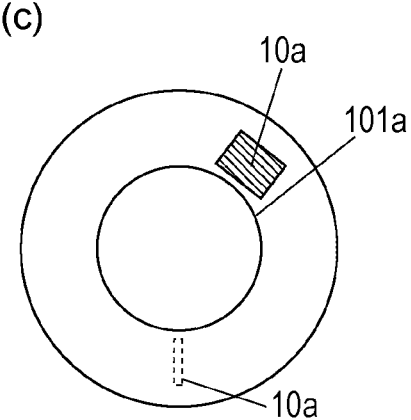
(d)
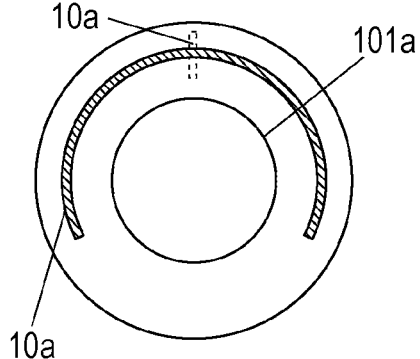

SEALED BATTERY

TECHNICAL FIELD

The present invention relates to sealed batteries, and more particularly, to a sealed battery having a gas venting function.

BACKGROUND ART

Lithium-ion secondary batteries have a high energy density and a large capacity, and are therefore widely used as driving power supplies for mobile data terminals, such as mobile phones and notebook computers. Recently, lithium-ion secondary batteries have been expected to be used in applications where high voltage and large capacity are required, such as driving power supplies for battery-driven automobiles and home use power storage systems.

A lithium-ion secondary battery includes a flammable organic solvent, and therefore the safety of the battery needs to be ensured. Accordingly, a sealing body that seals the battery is provided with a gas venting mechanism that vents gas in the battery to the outside of the battery when the battery internal pressure increases.

A technology regarding a gas venting mechanism according to the related art will be described with reference to FIG. 10. FIG. 10 is a sectional view of a sealing body having a structure of the related art.

A sealing body of a sealed battery according to the related art includes a valve cap 21 having vent holes 21a, a PTC thermistor 22, a pair of explosion prevention valves 23 and 25 having rupture grooves 23a and 25a that rupture when the battery internal pressure increases, an insulating plate 24 that prevents peripheral portions of the pair of explosion prevention valves 23 and 25 from coming in to electrical contact with each other, and a terminal plate 26 that has vent holes 26a and that is electrically connected to a positive plate. With this technology, when the battery internal pressure increases, first, the electrical contact between the pair of explosion prevention valves 23 and 25 is disconnected, so that the current path to the valve cap 21 is interrupted. When the battery internal pressure further increases, the rupture grooves 23a and 25a formed in the explosion prevention valves 23 and 25 rupture, so that holes are formed. And then, the gas in the battery is vented to the outside of the battery through the vent holes 26a, the holes formed in the pair of explosion prevention valves 23 and 25, and the vent holes 21a.

PTLs 1 to 3 listed below describe technologies for increasing the safety of the battery.

CITATION LIST

Patent Literature

PTL 1: Japanese Published Unexamined Patent Application No. 2010-287567

PTL 2: Japanese Published Unexamined Patent Application No. 2004-335287

PTL 3: Japanese Published Unexamined Patent Application No. 9-120811

PTL 1 discloses a technology regarding a battery interconnection system in which a vent, defined by scoring on a battery terminal, ruptures when the battery internal pressure exceeds a predefined battery operating range, causing an interruptible electrical connector to break and disrupt electrical continuity between a connector plate and the battery terminal. It is described that, with this technology, a system for integrating the venting feature of a battery with a device for simultaneously disconnecting the cell from the battery pack, thereby isolating the cell, is provided.

PTL 2 discloses a technology in which a sealing body has an annular groove that is divided into segments by connecting portions, and in which the connecting portions are provided at least at two locations. It is described that, with this technology, a non-aqueous secondary battery in which a groove reliably ruptures in response to an abnormal increase in the internal pressure of the battery but does not unexpectedly rupture in response to a small impact is provided.

PTL 3 discloses a safety valve including a first safety valve and a second safety valve. The first safety valve is self-restorable and capable of opening and closing repeatedly. The second safety valve is non-self-restorable and includes a slit formed in an annular shape such that a hinge portion is left uncut, and a thermoplastic resin that airtightly covers the slit. With this safety valve, the second safety valve has a valve opening pressure higher than that of the first safety valve and lower than the pressure at which the sealing of the battery casing breaks, and the second safety valve opens when the thermoplastic resin breaks and the portion surrounded by the slit is bent at the hinge portion. It is described that, with this technology, the battery can be used even after the battery internal pressure has increased owing to the self-restorable first safety valve, and the battery casing can be effectively prevented from rupturing owing to the non-self-restorable second safety valve.

SUMMARY OF INVENTION

Technical Problem

In recent years, with further increase in energy density of the battery, the possibility that the battery temperature and battery internal pressure will rapidly increase in case of an abnormality has increased. Therefore, there is a risk that the gas venting performance will not be enough to deal with the rapid increase in pressure even when the above-described sealing bodies are provided. In addition, an increase in battery temperature causes a reduction in the strength of an outer can. As a result, a crack may be formed in the side wall of the outer can. If the gas or electrolyte leaks through the crack, the leakage may cause abnormalities in the surrounding components.

Driving power supplies for battery-driven automobiles, home use power storage systems, etc., generally include a battery assembly in which a plurality of unit batteries are connected in series and/or parallel. If a crack is formed in the side wall of the outer can of one of the unit batteries included in the battery assembly and leakage of the gas or electrolyte occurs, there is a higher risk that, for example, the unit batteries disposed around the unit battery with the crack will burn. For these reasons, it has become necessary to prevent cracking of the side wall of the outer can. However, these problems are not taken into account in the above-described technologies.

The present invention has been made to solve the above-described problems, and an object of the present invention is to provide a sealed battery from which gas can be vented without causing a side wall of an outer can to crack.

Solution to Problem

To achieve the above-described object, according to the present invention, a sealed battery includes a bottomed cylindrical outer can having an opening, the opening and a sealing body being crimp-sealed with an insulating gasket interposed therebetween. The sealing body includes a first plate-shaped member made of aluminum or an aluminum alloy and a second plate-shaped member made of a material harder than the first plate-shaped member and bonded to a surface of the first plate-shaped member, the surface facing the outside of the battery. At least the first plate-shaped member is crimp-sealed at an outer periphery thereof, and the crimp-sealed plate-shaped member has a thin portion on at least one surface thereof, the thin portion serving as a starting point of deformation of the sealing body when an battery internal pressure increases. When the battery internal pressure increases, the sealing body is deformed so that a gap is formed between the insulating gasket and the sealing body, and gas in the outer can is vented to the outside of the outer can.

The effects of the above-described structure will be described with reference to FIGS. 1 and 2. FIG. 1 is a sectional view of a sealed battery according to the present invention, and FIG. 2 is a diagram illustrating the manner in which a sealing portion of the sealed battery according to the present invention is deformed as a result of an increase in the internal pressure.

As illustrated in FIGS. 1 and 2, a sealing body 10 of a sealed battery according to the present invention includes a first plate-shaped member 101 made of aluminum or an aluminum alloy and a second plate-shaped member 102 made of a material harder than the first plate-shaped member 101. A surface of the first plate-shaped member 101 that faces the outside of the battery and a surface of the second plate-shaped member 102 that faces the inside of the battery are bonded together with a bonding portion (welded portion) 10b. At least the first plate-shaped member 101 is crimp-sealed at the outer periphery thereof, and the crimp-sealed plate-shaped member (first plate-shaped member 101 in FIG. 1) has a thin portion 10a on at least one surface thereof. The thickness at the thin portion 10a is smaller than that at other portions, and thus the strength is reduced at the thin portion 10a.

Accordingly, when the battery internal pressure increases, deformation of the sealing body 10 starts at the thin portion 10a while the state in which the first plate-shaped member 101 and the second plate-shaped member 102 of the sealing body 10 are bonded together by the welded portion 10b is maintained (see FIGS. 2(a) and 2(b)). As the deformation of the sealing body 10 progresses, the contact force between an insulating gasket 11 and the sealing body 10 decreases, and a gap that allows gas to be vented therethrough is formed between the sealing body 10 and the insulating gasket 11 (see FIGS. 2(c) and 2(d)). Thus, a large opening is immediately formed in the battery, and therefore sufficient gas venting performance can be obtained even when the gas is rapidly produced. A side wall of an outer can 5 is prevented from being damaged by the internal pressure after the opening has been formed, and the risk that the side wall of the outer can 5 will crack can be significantly reduced. Accordingly, the gas and electrolyte in the outer can 5 may be guided such that they are vented only from the sealing-body-10 side. Therefore, components adjacent to the side wall of the outer can 5 are prevented from being adversely affected. In the case where, for example, the sealed battery according to the present invention is used as one of unit batteries in a battery assembly, even when an abnormality occurs in one of the unit batteries, the safety of the other unit batteries of the battery assembly is not reduced.

Since the strength of the sealing body 10 is increased by the second plate-shaped member 102, unnecessary deformation of the sealing body 10 due to an impact or the like does not occur.

Here, it is not necessary that the first plate-shaped member 101 and the second plate-shaped member 102 be bonded over the entire area thereof as long as they are partially bonded together. The bonding method is preferably a metallurgical bonding method, such as welding, soldering, or pressure welding, and more preferably, high-energy beam welding such as laser welding. As illustrated in FIG. 1, a gap may be provided between portions of the first plate-shaped member 101 and the second plate-shaped member 102.

It is essential that the first plate-shaped member 101 do not have a hole so that the electrolyte does not come into contact with the second plate-shaped member 102. In contrast, the second plate-shaped member 102 may have a hole. Each of the first and second plate-shaped members 101 and 102 may either be flat or include a step that projects toward the inside or outside of the battery. The first plate-shaped member 101 and the second plate-shaped member 102 may include steps projecting in the same direction or different directions. The thickness of each of the plate-shaped members may be uniform or non-uniform.

The first plate-shaped member 101, which is located at a side of the sealing body 10 that faces the inside of the battery, is made of aluminum or an aluminum alloy. These materials are light, easily deformable, and highly resistant to the electrolyte, and are therefore suitable as the material of a portion of the sealing body at the inner side.

In the above-described structure, the second plate-shaped member may be formed of a stainless steel plate or a nickel-plated steel plate. The stainless steel plate and the nickel-plated steel plate are inexpensive, strong, and highly resistant to rust, and are therefore suitable as the material for the sealing body. In addition, the stainless steel plate and the nickel-plated steel plate can be more easily welded compared to the material of the first plate-shaped member, that is, aluminum or an aluminum alloy. Therefore, when these materials are used as the material of the second plate-shaped member, which is located at the outer side, welding of leads and the like can be facilitated.

In the above-described structure, the outer can may include a side wall having a grooved portion that projects toward a battery axis, and the thin portion may be provided in a region on the inner side of the grooved portion.

In the case where crimp sealing is performed, the outer can 5 often includes a side wall having a grooved portion 5a that projects toward the battery axis. The battery internal pressure is hardly applied to the sealing body in a region on the outer side of the grooved portion 5a. Therefore, if the thin portion 10a is in this region, there is a risk that the effect of the present invention will be reduced. Therefore, in the case where the grooved portion 5a is formed, the thin portion 10a is preferably formed on the sealing body in an area including the region on the inner side of the grooved portion 5a, and more preferably, only in the region on the inner side of the grooved portion 5a.

In addition, the entirety of the sealing body 10 is preferably located below a top surface of the outer can 5. In the case where the entirety of the sealing body 10 is located below the top surface of the outer can 5, the space efficiency can be increased. Moreover, the sealing body 10 can be prevented from receiving a direct impact, so that unnecessary deformation of the sealing body 10 can be suppressed.

The above-described structure may be such that, when the battery internal pressure further increases, the sealing body is completely released from the outer can. With this structure, the area of the opening through which the gas is vented can be significantly increased.

In the above-described structure, the sealed battery may be a lithium-ion secondary battery including a positive plate, and the positive plate may include a lithium-nickel composite oxide as a positive electrode active material, the lithium-nickel composite oxide being expressed by a general formula $Li_xNi_yM_{1-y}O_2$ ($0.95 \leq x \leq 1.10$, M is at least one of Co, Mn, Cr, Fe, Mg, Ti, and Al, and $0.6 \leq y \leq 0.95$). The sealed battery may have a volume energy density of 500 Wh/L or more.

The lithium-nickel composite oxide has a larger capacity and higher energy density and is less expensive compared to a lithium-cobalt composite oxide ($LiCoO_2$) that is commonly used as the positive electrode active material of a lithium-ion secondary battery. Therefore, a battery having a volume energy density as high as 500 Wh/L or more can be produced at a low cost. In the case where the lithium-nickel composite oxide is used, there is a problem that when an abnormality occurs in the battery, a larger amount of gas is generated than in the case where the lithium-cobalt composite oxide is used. However, when the structure of the present invention is employed, even when the gas is rapidly generated as described above, the risk that the side wall of the outer can will crack can be reduced. The weight of the lithium-nickel composite oxide is preferably 50 wt % or more of the total weight of the positive electrode active material, more preferably, 80 wt % or more of the total weight, and most preferably, 100 wt % of the total weight.

As illustrated in FIGS. 3 to 5, the number of thin portions 10a may be one, two, or more. There is no particular limitation regarding the shape of the thin portions in plan view, and the thin portions may have the shape of a line, such as a straight line or a curved line, a polygonal shape, a circular shape, an irregular shape, or any combination thereof in plan view. In the case where a plurality of thin portions are provided, the thin portions may be arranged regularly (formed in the same size and arranged with constant intervals), or randomly such that the thin portions have different lengths and intervals therebetween. Also, the thin portions may be disposed so as to partially overlap one another.

For example, as illustrated in FIG. 3, one or more thin portions 10a having the shape of a straight line may be provided. In this case, the straight line may be a line that extends along a diameter of the sealing body 10, as illustrated in FIG. 3(a), or a line that does not extend along a diameter of the sealing body 10, as illustrated in FIG. 3(b). In the case where a plurality of thin portions having the shape of a straight line are provided, the thin portions may be arranged on the sealing body 10 evenly (at constant intervals) as illustrated in FIG. 3(c), or unevenly (randomly) as illustrated in FIG. 3(d).

Alternatively, as illustrated in FIG. 4, one or more thin portions 10a having the shape of a curved line may be provided. In this case, the curved line may be a circle (see FIG. 4(a)) or an arc (see FIG. 4(b)) that is concentric with the outer peripheral line of the sealing body 10, or a line that is not concentric with the outer peripheral line of the sealing body 10 (see FIGS. 4(c) and 4(d)).

As illustrated in FIG. 5, each thin portion 10a may have a planar shape. There is no particular limitation regarding the planar shape, and the planar shape may be a polygonal shape (see FIG. 5(a)), a circular shape, an elliptical shape, a fan shape, or any other irregular shape (see FIG. 5(b)). As illustrated in FIGS. 5(c) and 5(d), thin portions having a linear line, a curved line, or a planar shape may be provided in combination. The thin portions 10a may be arranged such that they partially overlap (see FIG. 5(c)), or such that they do not overlap (see FIG. 5(d)).

There is no particular limitation regarding the cross-sectional shape of the thin portions. For example, thin portions having a linear shape may be formed by forming a recess having a V-shaped (triangular), rectangular, U-shaped, or semicircular cross section, and the depth of the recess may be either uniform or non-uniform. Also, thin portions having a planar shape may have a flat surface that is parallel to a surface of the sealing body, or an irregular surface with projections and recesses that are arranged regularly or irregularly. To prevent rupture of the thin portion, preferably, the recess is formed so as to have obtuse or rounded corners. In addition, preferably, the thin portions are formed as a recess in a surface that faces the inside of the battery, and the remaining thickness thereof is set to such a thickness that rupture does not easily occur.

The thin portions 10a may be formed by forming a recess in a surface of the sealing body 10 that faces the inside of the battery, as illustrated in FIGS. 3 to 5 and 7(b), or by forming a recess in a surface of the sealing body 10 that faces the outside of the battery, as illustrated in FIGS. 6(a), 6(b), and 7(a). Alternatively, as illustrated in FIGS. 6(c), 6(d), 7(c), and 7(d), the thin portions 10a may be formed by forming recesses in both surfaces of the sealing body 10. In FIG. 6, the thin portions 10a formed by forming a recess in the surface that faces the outside of the battery are shown by the dashed lines. In the case where recesses are formed in both surfaces of the sealing body 10, the recesses in both surfaces may be arranged such that they coincide with each other in plan view of the sealing body 10 (see FIG. 7(c)), such that they do not overlap each other in plan view of the sealing body 10 (see FIGS. 6(c) and 7(d)), or such that they partially overlap each other in plan view of the sealing body 10 (see FIG. 6(d)).

In the present invention, the crimp-sealed plate-shaped member is provided with the thin portion 10a. In the case where only the first plate-shaped member 101 is crimp-sealed, the thin portion 10a is necessarily formed on the first plate-shaped member 101. In the case where both the first and second plate-shaped members 101 and 102 are crimp-sealed, the thin portion 10a may be formed on the second plate-shaped member 102, on the first plate-shaped member 101, or on each of the first and second plate-shaped members 101 and 102. In the case where the thin portion 10a is formed on each of the first and second plate-shaped members, the thin portions 10a formed on the first and second plate-shaped members 101 and 102 may be arranged such that they coincide with each other in plan view of the sealing body 10, or such that they do not coincide with each other in plan view of the sealing body 10. The thin portions 10a may be formed on the surfaces of the first and second plate-shaped members that are in contact with each other, or on the opposite surfaces. Preferably, the thin portions 10a are formed on the surfaces opposite the surfaces that are in contact with each other.

There is no particular limitation regarding the arrangement of each thin portion 10a. However, a part that is crimp-sealed with the insulating gasket 11 is not deformed when the internal pressure increases. Therefore, when a thin portion is provided on this part, the thin portion does not serve as the thin portion according to the present invention that serves as a starting point of deformation of the sealing body when the battery internal pressure increases. Namely, it is necessary that at least a part of the thin portion 10a be provided on a part of the sealing body that is not crimp-sealed with the insulating gasket 11. When the thin portion is provided on the crimp-sealed part, there is a risk that the sealing reliability will be reduced. Therefore, it is preferable that no part of the thin portion be provided on the crimp-sealed part of the sealing body 10. In the case where the sealing body 10 has a step portion, at least a part of the thin portion 10*a* is preferably provided in a region on the outer side of the step portion.

There is no particular limitation regarding the method for forming the thin portion. However, press working is preferably employed since the thin portion can be readily formed in such a case.

The sealing body preferably functions as an external terminal of one of positive and negative electrodes of the battery. In such a case, the structure of the battery can be simplified. The outer can preferably functions as an external terminal of the other one of the positive and negative electrodes.

The first plate-shaped member 101 and the second plate-shaped member 102 may include step portions 101*a* and 102*a*, respectively, or have flat surfaces. The step portion 101*a* of the first plate-shaped member 101 and the step portion 102*a* of the second plate-shaped member 102 may project in the same direction or in different directions. Each plate-shaped member may include a plurality of step portions arranged so as to project in the same direction or in different directions. When the step portions are provided, the strength of the plate-shaped members can be increased.

Advantageous Effects of Invention

According to the above-described present invention, a sealed battery with which gas is vented only from the sealing-body side can be provided. With this sealed battery, components arranged adjacent to the side wall of the outer can are not adversely affected. For example, in the case where the sealed battery is applied to a battery assembly, the safety of the other batteries is not reduced.

BRIEF DESCRIPTION OF DRAWINGS

FIG. 4 shows bottom views illustrating modifications of arrangements of thin portions on the sealing body.

FIG. 6 shows see-through bottom views illustrating arrangements of thin portions in the case where the thin portions are provided at least on a surface of the sealing body that faces the outside of the battery.

DESCRIPTION OF EMBODIMENTS

First Embodiment

Figure 1:
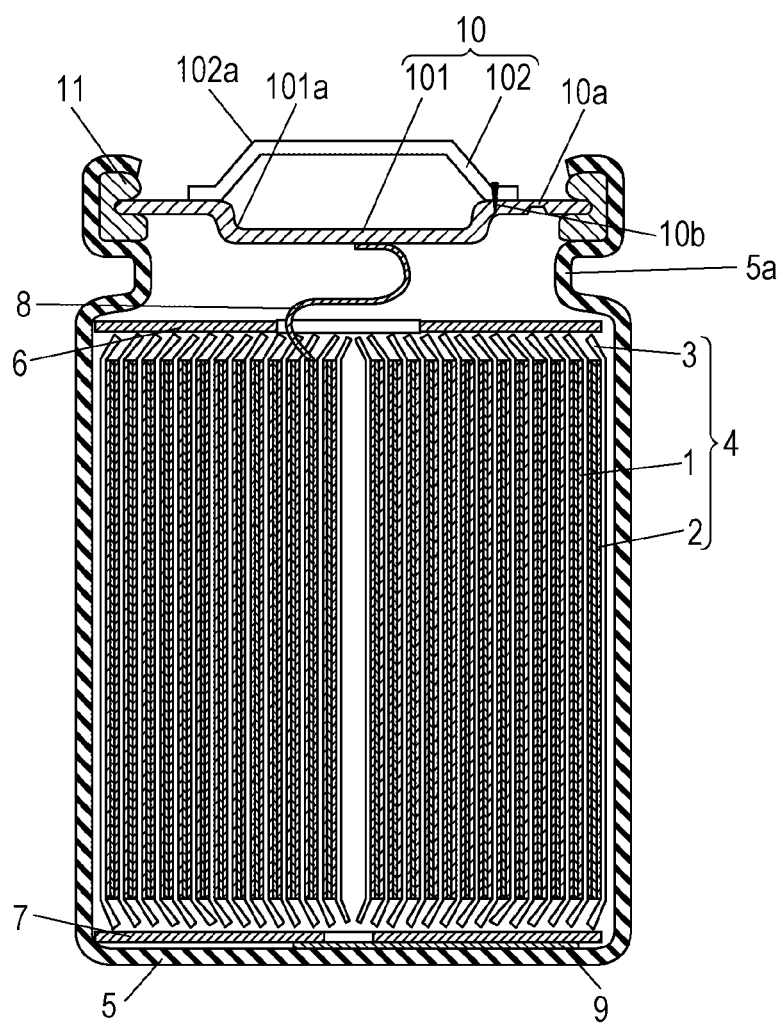
FIG. 1 is a sectional view of a sealed battery according to the present invention.

An embodiment of the present invention will be described in detail with reference to the drawings by way of an example in which the present invention is applied to a lithium-ion secondary battery. FIG. 1 is a sectional view of a sealed battery according to the present invention, and FIG. 2 shows enlarged partial sectional views illustrating the manner in which a sealing portion of the sealed battery according to the present invention is deformed as a result of an increase in the internal pressure.

As illustrated in FIG. 1, a non-aqueous electrolyte secondary battery according to the present embodiment includes a wound electrode group 4 including a positive plate 1 and a negative plate 2 that are spirally wound with a separator 3 interposed therebetween. The wound electrode group 4 is provided with insulating plates 6 and 7 that are respectively arranged at the top and bottom thereof, and is contained in a bottomed cylindrical metal outer can 5. A non-aqueous electrolyte (not shown) is poured into the outer can 5, and the opening of the outer can 5 and a sealing body 10 are crimp-sealed with a gasket 11 interposed therebetween. The negative plate 2 has a lead 9 that is welded to an inner bottom portion of the outer can 5, and the positive plate 1 has a lead 8 that is welded to the bottom surface of the sealing body 10. Thus, the outer can 5 serves as an external terminal of a negative electrode, and the sealing body 10 serves as an external terminal of a positive electrode. A peripheral portion of the upper insulating plate 6 is retained by a grooved portion 5*a* formed on a side wall of the outer can 5, thereby securing the wound electrode group 4 from the top.

Figure 2:
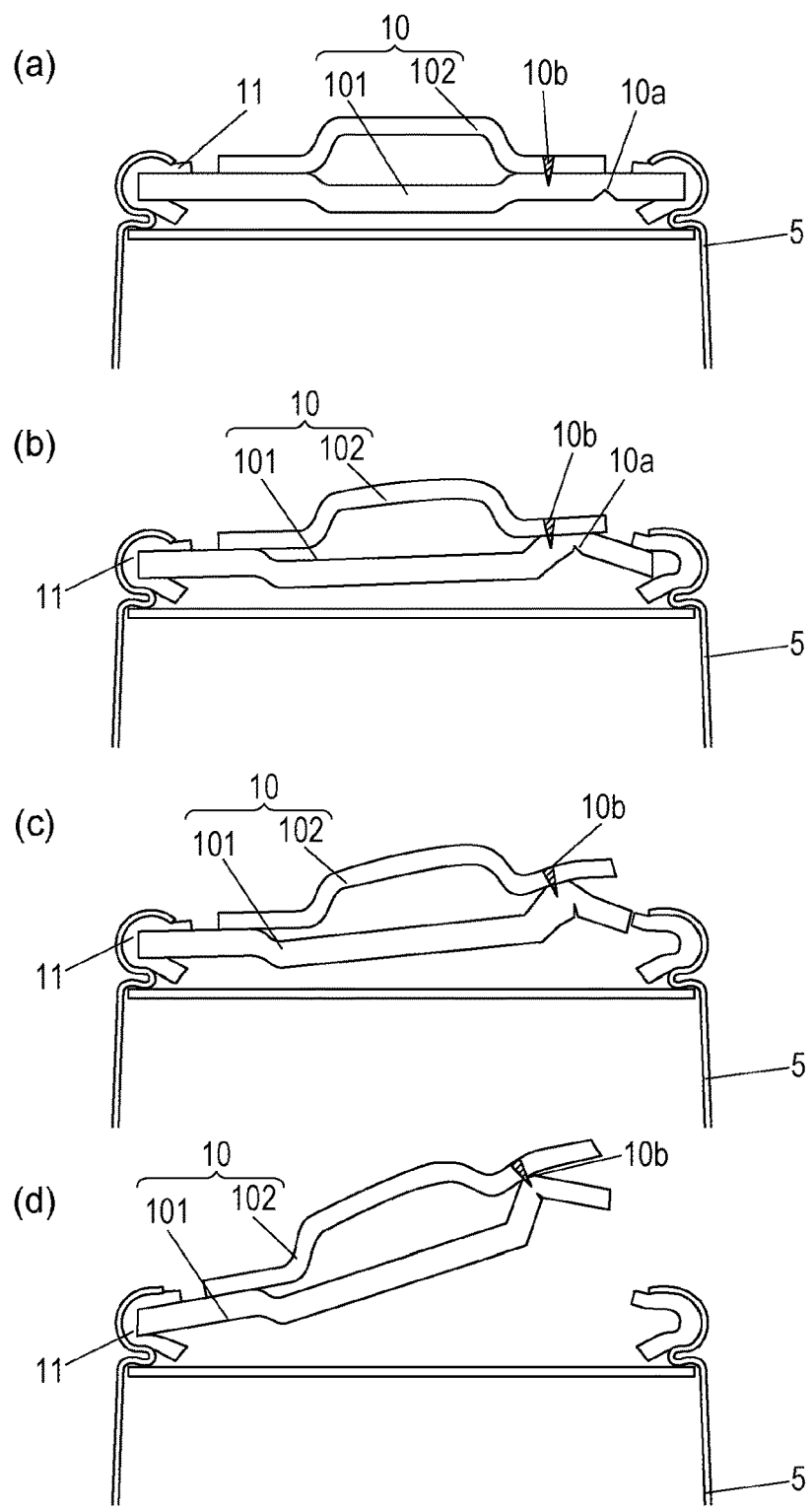
FIG. 2 shows enlarged partial sectional views illustrating the manner in which a sealing portion of the sealed battery according to the present invention is deformed as a result of an increase in the internal pressure.

As illustrated in FIGS. 1 and 2, the sealing body 10 includes a first plate-shaped member 101 made of aluminum or an aluminum alloy and a second plate-shaped member 102 made of a material harder than the first plate-shaped member 101. A surface of the first plate-shaped member 101 that faces the outside of the battery and a surface of the second plate-shaped member 102 that faces the inside of the battery are bonded together with a welded portion 10*b*. The planar size of the first plate-shaped member 101 is greater than that of the second plate-shaped member. The first plate-shaped member 101 is crimp-sealed at the outer periphery thereof, and the second plate-shaped member 102 is not crimp-sealed at the outer periphery thereof. The first plate-shaped member 101, which is crimp-sealed, has a thin portion 10*a* at which the thickness is smaller than that at other portions, and thus the strength is reduced at the thin portion 10*a*.

In the above-described structure, when the battery internal pressure increases, deformation of the sealing body 10 starts at the thin portion 10*a* while the state in which the first plate-shaped member 101 and the second plate-shaped member 102 of the sealing body 10 are bonded together by the welded portion 10*b* is maintained (see FIGS. 2(*a*) and 2(*b*)). As the deformation of the sealing body 10 progresses, the crimp seal between the insulating gasket 11 and the sealing body 10 weakens, and a gap that allows gas to be vented therethrough is formed between the sealing body 10 and the insulating gasket 11 (see FIGS. 2(*c*) and 2(*d*)). When the battery internal pressure further increases, the sealing body 10 is released from the outer can 5. Thus, a large opening is immediately formed in the battery, and therefore sufficient gas venting performance can be obtained even when the gas is rapidly produced. The side wall of the outer can 5 is prevented from being damaged by the internal pressure after the opening has been formed, and the risk that the side wall of the outer can 5 will crack can be reduced. Accordingly, the gas and an electrolyte in the outer can may be guided such that they are vented only from the sealing-body side. Therefore, components adjacent to the side wall of the outer can are prevented from being adversely affected. In the case where, for example, the sealed battery according to the present invention is used as one of unit batteries in a battery assembly, even when an abnormality occurs in one of the unit batteries, the safety of the other batteries of the battery assembly is not reduced.

Figure 9:
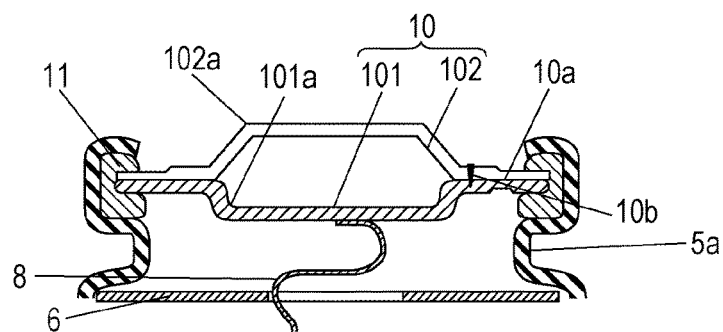
FIG. 9 is a sectional view illustrating a modification of the manner in which a first plate-shaped member and a second plate-shaped member of the sealing body are bonded together.

As illustrated in FIG. 9, the first plate-shaped member 101 and the second plate-shaped member may have the same planar size, and both the first plate-shaped member 101 and the second plate-shaped member 102 may be crimp-sealed at the periphery thereof. In this case, the thin portion may be provided only on the second plate-shaped member 102, or on each of the plate-shaped members.

The first plate-shaped member 101, which is at a side of the sealing body 10 that faces the inside of the battery, is made of aluminum or an aluminum alloy. Aluminum and aluminum alloys are light, easily deformable, and highly resistant to the electrolyte, and are therefore suitable as the material of the sealing body 10.

The second plate-shaped member 102, which is at a side of the sealing body 10 that faces the outside of the battery, is preferably formed of a stainless steel plate or a nickel-plated steel plate. The stainless steel plate and the nickel-plated steel plate are inexpensive, strong, and highly resistant to rust. In addition, the stainless steel plate and the nickel-plated steel plate can be more easily welded compared to the material of the first plate-shaped member, that is, aluminum or an aluminum alloy. Therefore, when these materials are used as the material of the second plate-shaped member, which is located at the outer side, welding of leads and the like can be facilitated.

Other components may be attached to the sealing body 10 as long as the function of the present invention is not adversely affected.

The grooved portion 5a that projects toward the battery axis is formed on the side wall of the outer can 5. The insulating gasket 11 is located above the grooved portion 5a and secures the sealing body 10. The thin portion 10a of the sealing body 10 is provided in a region on the inner side of the grooved portion 5a. This is because the deformation-promoting effect is small when the thin portion 10a is provided in a region on the outer side of the grooved portion 5a.

In addition, the entirety of the sealing body 10 is preferably located below a top surface of the outer can 5. In the case where the entirety of the sealing body 10 is located below the top surface of the outer can 5, the space efficiency can be increased. Moreover, the sealing body 10 can be prevented from receiving a direct impact, so that unnecessary deformation of the sealing body 10 can be suppressed.

The first plate-shaped member 101 and the second plate-shaped member 102 may include step portions 101a and 102a, respectively, or have flat surfaces. The step portion 101a of the first plate-shaped member 101 and the step portion 102a of the second plate-shaped member 102 may project in the same direction or in different directions. Each plate-shaped member may include a plurality of step portions arranged so as to project in the same direction or in different directions. When the step portions are provided, the strength of the plate-shaped members can be increased.

Figure 3:
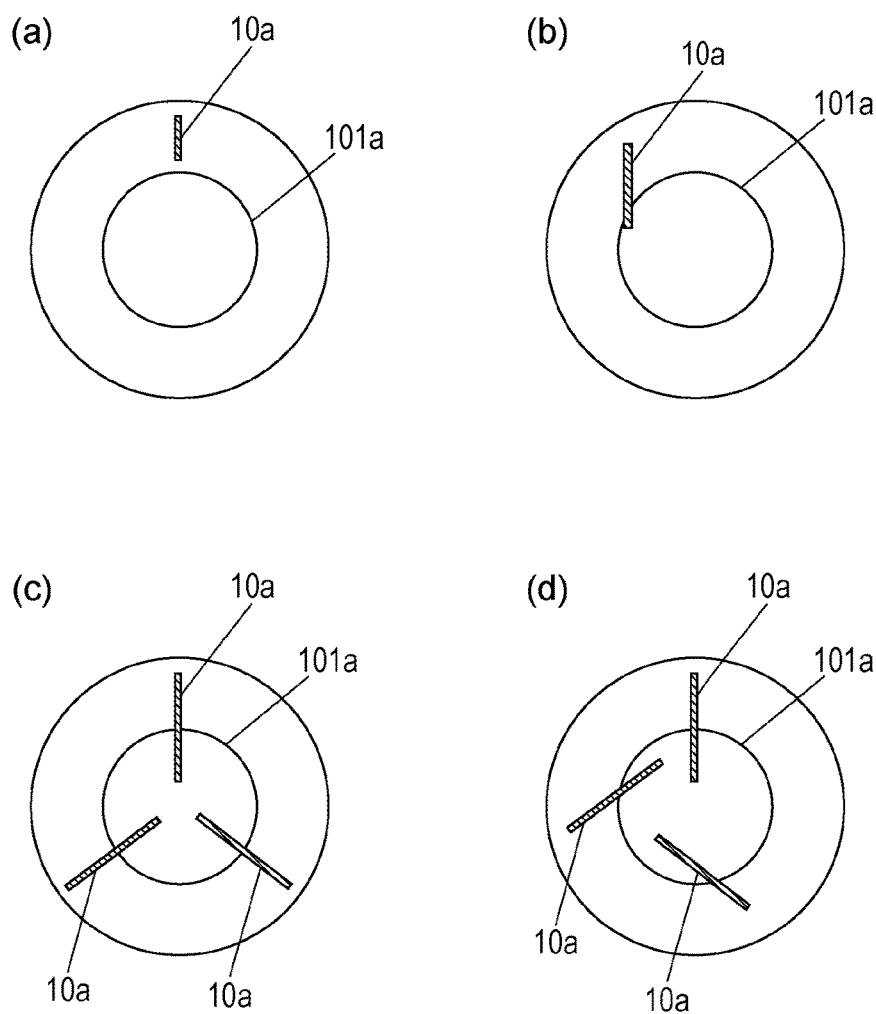
FIG. 3 shows bottom views illustrating examples of arrangements of thin portions on a sealing body.
Figure 5:
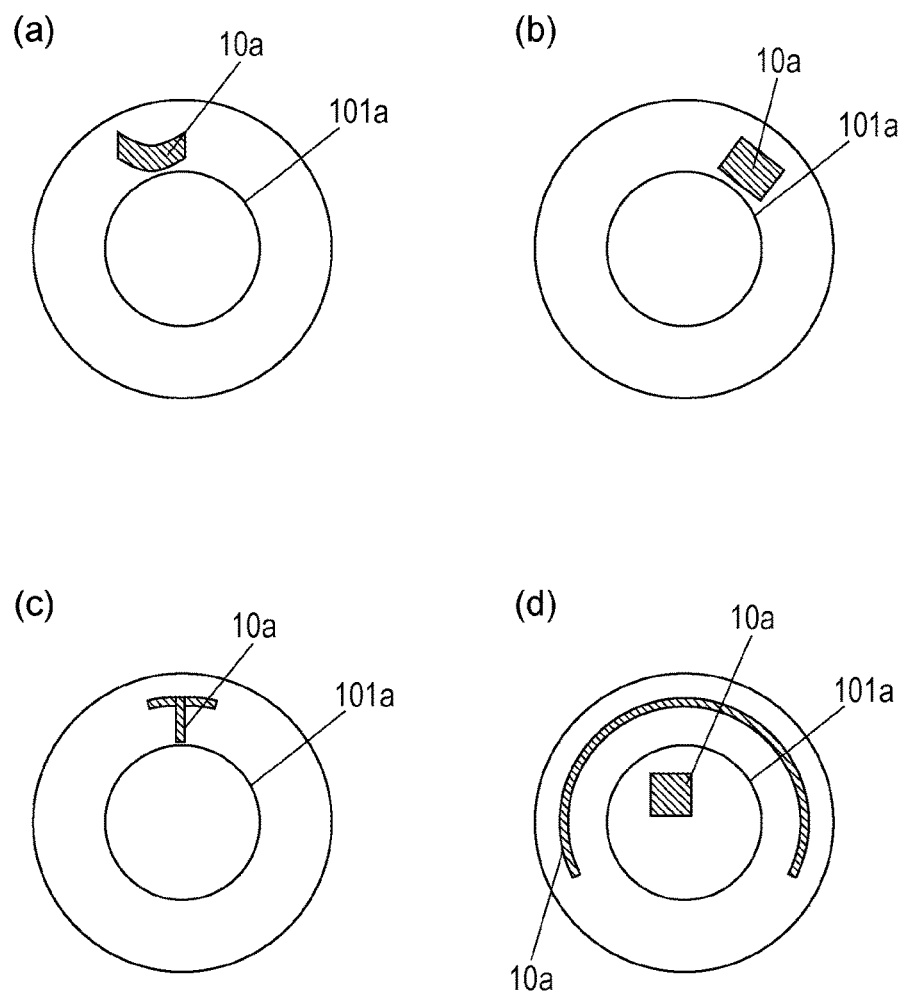
FIG. 5 shows bottom views illustrating additional modifications of arrangements of thin portions on the sealing body.

As illustrated in FIGS. 3 to 5, the number of thin portions may be one, two, or more. There is no particular limitation regarding the shape of the thin portions in plan view, and the thin portions may have the shape of a line, such as a straight line or a curved line, a polygonal shape, a circular shape, an irregular shape, or any combination thereof in plan view. In the case where a plurality of thin portions are provided, the thin portions may be arranged regularly (formed in the same size and arranged with constant intervals), or randomly such that the thin portions have different lengths and intervals therebetween. Also, the thin portions may be disposed so as to partially overlap one another.

Figure 7:
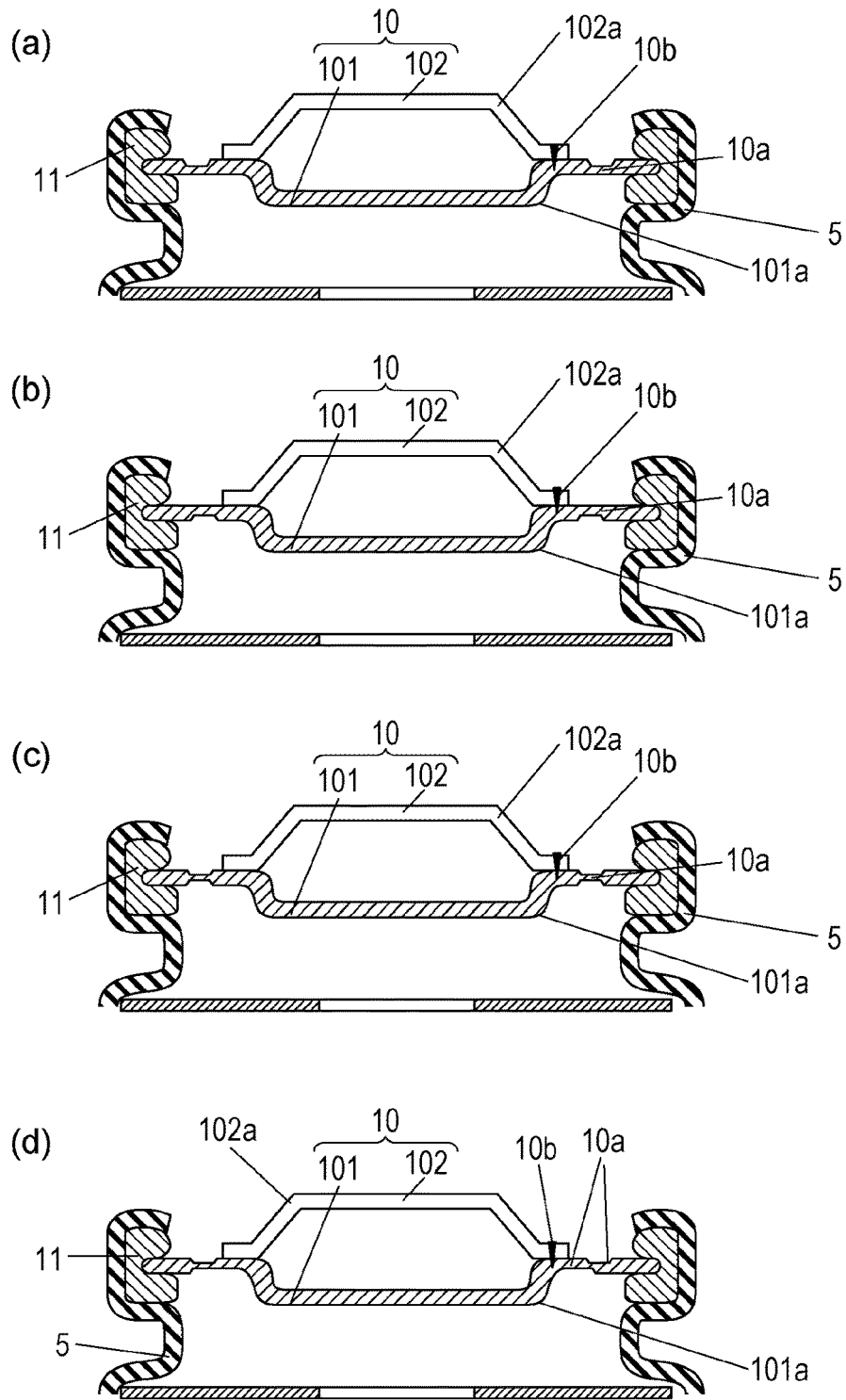
FIG. 7 shows sectional views illustrating modifications of arrangements of thin portions on the sealing body.

FIGS. 3 to 5 show bottom views illustrating examples of arrangements of thin portions on the sealing body. FIG. 6 shows see-through bottom views illustrating arrangements of thin portions in the case where the thin portions are provided at least on a surface of the sealing body that faces the outside of the battery. FIG. 7 shows sectional views illustrating modifications of arrangements of thin portions on the sealing body. The straight line may be a line that extends along a diameter of the sealing body 10, as illustrated in FIG. 3(*a*), or a line that does not extend along a diameter of the sealing body 10, as illustrated in FIG. 3(*b*). In the case where a plurality of thin portions having the shape of a straight line are provided, the thin portions may be arranged on the sealing body 10 evenly as illustrated in FIG. 3(*c*), or unevenly as illustrated in FIG. 3(*d*).

Alternatively, as illustrated in FIG. 4, for example, one or more thin portions 10a having the shape of a curved line may be provided. In this case, the curved line may be a circle or an arc that is concentric with the outer peripheral line of the sealing body 10, as illustrated in FIGS. 4(*a*) and 4(*b*), or a randomly curved line that is not concentric with the outer peripheral line of the sealing body 10, as illustrated in FIGS. 4(*c*) and 4(*d*).

As illustrated in FIG. 5, for example, each thin portion 10a may have a planar shape. There is no particular limitation regarding the planar shape, and the planar shape may be a polygonal shape (see FIG. 5(*a*)), a circular shape, an elliptical shape, a fan shape, or any other irregular shape (see FIG. 5(*b*)). As illustrated in FIGS. 5(*c*) and 5(*d*), thin portions having a linear line, a curved line, or a planar shape may be provided in combination. The thin portions 10a may be arranged such that they overlap (see FIG. 5(*c*)), or such that they do not overlap (see FIG. 5(*d*)).

The thin portions 10a may be formed by forming a recess in a surface of the sealing body 10 that faces the inside of the battery, as illustrated in FIGS. 3 to 5 and 7(*b*), or by forming a recess in a surface of the sealing body 10 that faces the outside of the battery, as illustrated in FIGS. 6(*a*), 6(*b*), and 7(*a*). Alternatively, as illustrated in FIGS. 6(*c*), 6(*d*), 7(*c*), and 7(*d*), the thin portions 10a may be formed by forming recesses in both surfaces of the sealing body 10. In the case where recesses are formed in both surfaces of the sealing body 10, the recesses in both surfaces may be arranged such that they coincide with each other in plan view of the sealing body 10 (see FIG. 7(*c*)), such that they do not overlap each other in plan view of the sealing body 10 (see FIGS. 6(*c*) and 7(*d*)), or such that they partially overlap each other in plan view of the sealing body 10 (see FIG. 6(*d*)).

There is no particular limitation regarding the arrangement of each thin portion 10a. However, in the case where the sealing body 10 has a step portion, at least a part of the thin portion 10a is preferably provided in a region on the outer side of the step portion.

There is no particular limitation regarding the cross-sectional shape of the thin portions. For example, thin portions having a linear shape may be formed by forming a recess having a V-shaped (triangular), rectangular, U-shaped, or semicircular cross section, and the depth of the recess may be either uniform or non-uniform. Also, thin portions having a planar shape may have a flat surface that is parallel to a surface of the sealing body, or an irregular surface with projections and recesses that are arranged regularly or irregularly. To prevent rupture of the thin portion, preferably, the recess is formed so as to have obtuse or rounded corners. In addition, preferably, the thin portions are formed as a recess in a surface that faces the inside of the battery, and the remaining thickness thereof is set to such a thickness that rupture does not easily occur.

The present invention will be further described by way of examples.

Example 1

Preparation of Positive Electrode

A lithium-nickel-cobalt-aluminum composite oxide ($LiNi_{0.8}Co_{0.15}Al_{0.05}O_2$) that serves as a positive electrode active material, acetylene black that serves as a conducting agent, and polyvinylidene fluoride (PVDF) that serves as a binder were prepared at a mass ratio of 100:2.5:1.7, and were mixed with N-methyl-2-pyrrolidone, which is an organic solvent. Thus, positive electrode active material paste was prepared.

Next, the positive electrode active material paste was applied to both surfaces of a positive electrode current collector formed of an aluminum film (15 μm thick) to a uniform thickness by using a doctor blade.

This electrode plate was dried with a drier to remove the organic solvent, so that a dry electrode plate was obtained. The dry electrode plate was rolled with a rolling press, and was cut. Then, the positive electrode lead 8 made of aluminum was attached by ultrasonic welding to a portion of the positive electrode current collector to which the positive electrode active material paste was not applied. Thus, the positive plate 1 that was 573 mm long, 57 mm wide, and 163 μm thick was produced.

<Preparation of Negative Electrode>

Graphitizing carbon particles that serve as a negative electrode active material, polyvinylidene fluoride (PVDF) that serves as a binder, and carboxymethyl cellulose that serves as a thickener were mixed at a mass ratio of 100:0.6:1, and then were mixed with an appropriate amount of water. Thus, negative electrode active material paste was prepared.

Next, the negative electrode active material paste was applied to both surfaces of a negative electrode current collector made of a copper film (10 μm thick) to a uniform thickness by using a doctor blade.

This electrode plate was dried with a drier to remove the moisture, so that a dry electrode plate was obtained. Then, the dry electrode plate was rolled with a rolling press, and was cut. After that, the negative electrode lead 9 made of nickel was attached by ultrasonic welding to a portion of the negative electrode current collector to which the negative electrode active material paste was not applied. Thus, the negative plate 2 was produced.

<Preparation of Electrode Group>

The above-described positive and negative electrodes and the separator 3 made of a polyethylene microporous film were wound by a winder, and a piece of insulating tape was provided at the winding end. Thus, the wound electrode group 4 was completed.

<Preparation of Sealing Body>

Figure 8:
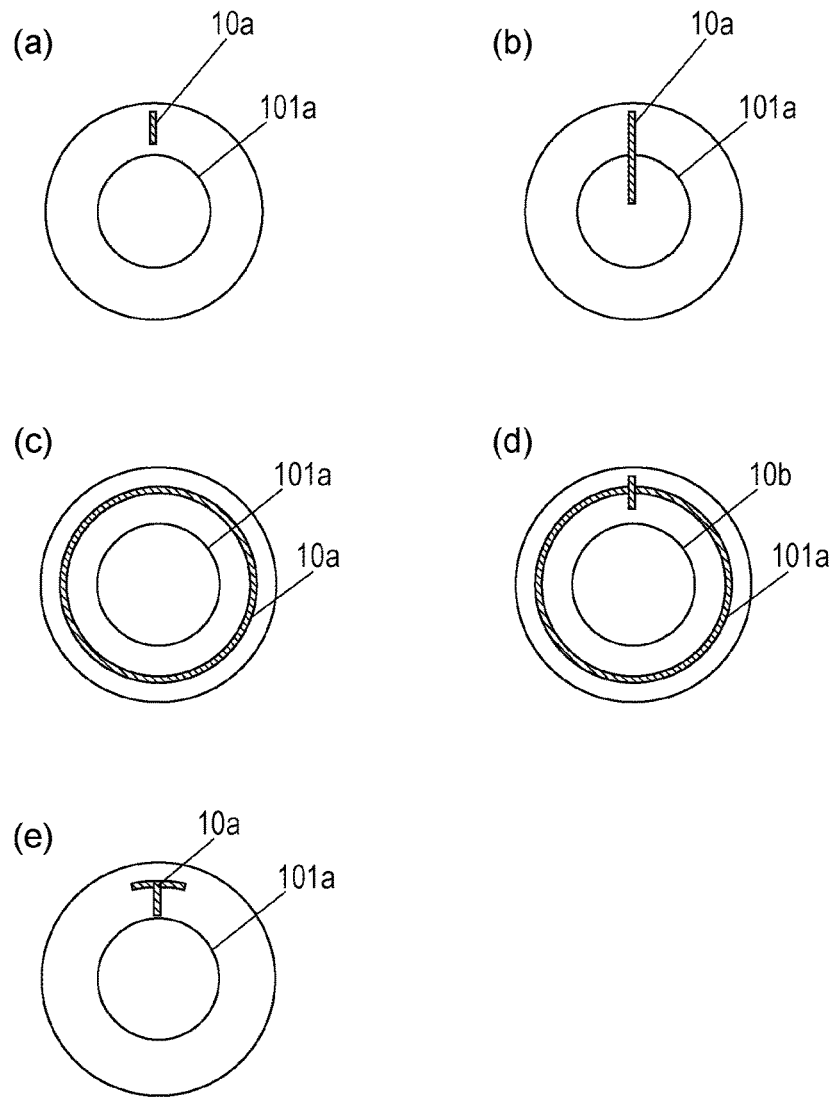
FIG. 8 shows bottom views illustrating arrangements of thin portions on the sealing body according to examples, wherein FIG. 8(*a*) shows Examples 1 to 3, FIG. 8(*b*) shows Examples 4 to 6, FIG. 8(*c*) shows Examples 7 to 9, FIG. 8(*d*) shows Examples 10 to 12, and FIG. 8(*e*) shows Examples 13 to 15.

The first plate-shaped member 101 having a diameter of 16.59 mm was produced by performing press working on a disc-shaped aluminum plate having a thickness of 0.8 mm. The first plate-shaped member 101 included the thin portion 10a (remaining thickness 0.6 mm) formed as a recess (0.2 mm deep) in the surface of the first plate-shaped member 101 facing the inside of the battery, and the step portion 101a projecting toward the inside of the battery. FIG. 8 shows bottom views illustrating arrangements of thin portions on the sealing body according to the examples. With regard to the shape and arrangement of each thin portion, the thin portion illustrated in FIG. 8(a) has the shape of a single straight line that extends along a diameter. The thin portion 10a was 1.5 mm long and 0.5 mm wide, and had a V-shaped cross section. The distance from the outer periphery of the sealing body to the thin portion 10a was 2.0 mm.

The second plate-shaped member 102 having a diameter of 11.1 mm was produced by performing press working on a disc-shaped nickel-plated steel plate to form the step portion 102a projecting toward the outside of the battery. The first and second plate-shaped members 101 and 102 were stacked together such that the centers thereof coincided, and a laser was applied to a portion of the second plate-shaped member that did not overlap the thin portion 10a, so that the plate-shaped members were welded together. Thus, the sealing body 10 structured such that the thin portion 10a was formed on the first plate-shaped member in a region where the first plate-shaped member did not overlap the second plate-shaped member 102, as illustrated in FIG. 1, was produced.

<Preparation of Non-Aqueous Electrolyte>

A non-aqueous solvent was produced by mixing ethylene carbonate (EC), dimethyl carbonate (DMC), and ethyl methyl carbonate (EMC) at a volume ratio of 2:2:6 (at 1 atm and 25° C.), and $LiPF_6$ that served as an electrolyte salt was dissolved into the non-aqueous solvent at a rate of 1.0 M (mol/liter). Thus, the non-aqueous electrolyte was prepared.

<Battery Assembly>

The insulating plates 6 and 7 made of polypropylene were arranged at the top and bottom of the electrode group 4, and the electrode group 4 was inserted into the outer can 5. Then, the negative electrode lead 9 was resistance-welded to the bottom of the cylindrical outer can 5. After that, the grooved portion 5a having a circular shape that was 1.0 mm wide and 1.5 mm deep was formed on the outer can 5, and the above-described non-aqueous electrolyte was injected into the cylindrical outer can 5. Then, the sealing body 10 and the positive electrode lead 8 were laser-welded together. The opening of the outer can 5 was crimp-sealed with the use of the sealing body 10 to which the gasket 11 was inserted. Thus, a sealed battery according to Example 1 having a height of 65 mm and a diameter of 18 mm was produced. The material of the cylindrical outer can was a steel plate plated with nickel, and the thickness thereof was 0.3 mm at the bottom and 0.25 mm at the side wall. The volume energy density of the battery was 600 Wh/L. In this battery, only the first plate-shaped member 101 of the sealing body 10 was crimp-sealed, and the second plate-shaped member 102 was not crimp-sealed.

Examples 2 to 15

Referring to Table 1 and FIG. 8, sealed batteries according to Examples 2 to 15 were manufactured by a method similar to that in Example 1 except that the arrangement, number, and remaining thickness of thin portions were changed. In each of Examples 2 and 3, the length of the thin portion 10a and the distance from the outer periphery of the sealing body to the thin portion 10a were the same as those in Example 1. In each of Examples 2 to 15, the groove had a width of 0.5 mm and a V-shaped cross section.

In Examples 4 to 6, the thin portion 10a was 1.5 mm long and the distance thereto from the outer periphery of the sealing body was 2.0 mm.

In Examples 7 to 9, the thin portion 10a had the shape of a circle concentric with the outer periphery of the sealing body, and the distance thereto from the outer periphery of the sealing body was 2.5 mm.

In Examples 10 to 12, among the thin portions 10a, the curved thin portion 10a had the shape of a circle concentric with the outer periphery of the sealing body, and the distance thereto from the outer periphery of the sealing body was 2.5 mm. The linear thin portion 10a was 1.0 mm long and the distance thereto from the outer periphery of the sealing body was 2.0 mm. The linear thin portion 10a intersected the curved thin portion at the midpoint thereof.

In Examples 13 to 15, among the thin portions 10a, the curved thin portion 10a had the shape of an arc concentric with the outer periphery of the sealing body, and the distance thereto from the outer periphery of the sealing body was 2.5 mm. The central angle of the arc was 20°. The linear thin portion 10a was 1.0 mm long and the distance thereto from the outer periphery of the sealing body was 2.0 mm. The arc-shaped thin portion 10a intersected the outer end of the linear thin portion at the midpoint thereof.

Comparative Example 1

Figure 10:
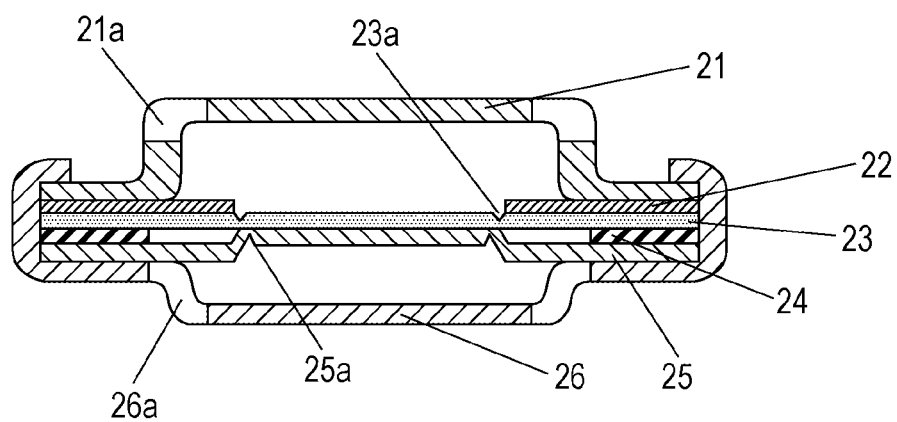
FIG. 10 is a sectional view of a sealing body according to the related art.

A sealed battery according to Comparative Example 1 was produced by a method similar to that in Example 1 except that the sealing body had a structure according to the related art in which the pair of explosion prevention valves 23 and 25 were provided, as illustrated in FIG. 10. The remaining thicknesses of the rupture grooves 23a and 25a in the explosion prevention valves 23 and 25 were 0.04 mm and 0.03 mm, respectively.

[Safety Test]

Ten sealed batteries were prepared for each of the above-described Examples 1 to 15 and Comparative Example 1, and were charged to a voltage of 4.2 V with a constant current of 1500 mA at a room temperature (25° C.). Then, the batteries were heated on a hot plate set to 200° C. Then, whether or not the sealing body had been removed from the outer can and whether or not cracks had been formed in the side wall of the outer can were visually observed. Table 1 shows the results of the observation.

TABLE 1

|  | Arrangement of thin portions | Remaining thickness of thin portions | Number of samples in which sealing body was separated | Number of samples in which cracks were formed |
| --- | --- | --- | --- | --- |
| Example 1 | FIG. 8(a) | 0.6 | 10 | 4 |
| Example 2 | FIG. 8(a) | 0.4 | 10 | 1 |
| Example 3 | FIG. 8(a) | 0.2 | 10 | 0 |
| Example 4 | FIG. 8(b) | 0.6 | 10 | 2 |
| Example 5 | FIG. 8(b) | 0.4 | 10 | 0 |
| Example 6 | FIG. 8(b) | 0.2 | 10 | 0 |
| Example 7 | FIG. 8(c) | 0.6 | 10 | 0 |
| Example 8 | FIG. 8(c) | 0.4 | 10 | 0 |
| Example 9 | FIG. 8(c) | 0.2 | 10 | 0 |
| Example 10 | FIG. 8(d) | 0.6 | 10 | 0 |
| Example 11 | FIG. 8(d) | 0.4 | 10 | 0 |
| Example 12 | FIG. 8(d) | 0.2 | 10 | 0 |
| Example 13 | FIG. 8(e) | 0.6 | 10 | 3 |
| Example 14 | FIG. 8(e) | 0.4 | 10 | 0 |
| Example 15 | FIG. 8(e) | 0.2 | 10 | 0 |
| Comparative Example 1 | FIG. 10 | — | 2 | 9 |

As is clear from Table 1, in Examples 1 to 15 in which the opening was sealed by using the sealing body 10 that was formed of a single aluminum plate and on which the thin portions 10a were formed, the number of samples in which cracks were formed in the side wall was 0 to 2. In contrast, in Comparative Example 1 in which the opening was sealed by using the sealing body formed of a plurality of members according to the related art, the number of samples in which cracks were formed in the side wall was 9. Thus, it is clear that the number of cracks formed in the side wall is significantly reduced in the batteries according to the examples.

The reason for this will now be discussed. According to the examples, when the battery internal pressure increases, deformation of the sealing body 10 is immediately started at the thin portions 10a that have a low strength. Accordingly, the contact force between the gasket 11 and the sealing body 10 decreases, and a gap that allows gas to be vented therethrough is formed. Eventually, the sealing body 10 is completely removed from the outer can 5 in all of the batteries (see FIG. 2). Therefore, a large opening is immediately formed in each battery, and therefore sufficient gas venting performance can be provided even when the gas is rapidly produced. Thus, the side wall of the outer can is prevented from being damaged after the valve has been activated (sealing body has been removed).

In contrast, in Comparative Example 1, when the battery internal pressure increases, the electrical connection between the pair of explosion prevention valves 23 and 25 is disconnected, resulting in the current interruption. And then, the rupture grooves in the explosion prevention valves 23 and 25 rupture to ensure a gas ventilation path. The gas ventilation path is smaller than that in the examples, and is not formed until the pressure reaches a pressure higher that in the examples. Therefore, in the case where the power of the gas is strong, the risk that the side wall of the outer can 5 will be damaged is higher than that in the examples. Accordingly, in Comparative Example 1, formation of cracks in the side wall of the outer can 5 cannot be sufficiently suppressed. When the cracks are formed in the side wall of the outer can 5, the gas or electrolyte may leak through the cracks. Therefore, there is a risk that components, batteries, or the like disposed around the battery in which an abnormality has occurred will be adversely affected. Here, the rupture of the rupture grooves 23a and 25a was observed in all of the batteries according to Comparative Example 1.

It is clear from Examples 1 to 15 that the number of samples in which cracks were formed decreases as the remaining thickness of the thin portions 10a decreases. This is probably because when the remaining thickness of the thin portions 10a decreases, the sealing body 10 can be deformed more quickly in response to an increase in the battery internal pressure, so that the gap is more quickly formed between the gasket 11 and the sealing body 10 and the sealing body 10 is more quickly separated.

In addition, it is clear from Examples 1 to 15 that as long as the thin portions 10a are formed on the sealing body 10, sufficient effect can be obtained irrespective of the planar shape and arrangement (linear shape, circular shape, arc shape, or combination thereof) of the thin portions 10a.

As is clear from the above-described test results, according to the present invention, a sealed battery including a sealing body provided with a safer gas ventilation valve can be provided without causing a deformation due to welding.

(Additional Description)

Although examples in which the present invention is applied to non-aqueous electrolyte secondary batteries are described above, the present invention is not limited to this. For example, the present invention may also be applied to alkaline storage batteries such as nickel-hydrogen storage batteries and nickel-cadmium storage batteries.

In the case where the present invention is applied to a non-aqueous electrolyte secondary battery, components of the battery may be made of known materials. Examples of known materials will now be described.

The positive plate according to the present invention may be obtained by forming positive electrode active material layers on a foil-shaped (thin-plate-shaped) positive electrode current collector. The material of the positive electrode current collector may be, for example, aluminum, an aluminum alloy, a stainless steel, titanium, or a titanium alloy. In particular, aluminum or an aluminum alloy is preferably used since electrochemical elusion or the like does not easily occur in such a case.

The positive electrode active material may be a lithium transition metal composite oxide, for example, a composite oxide containing lithium and at least one metal selected from cobalt, manganese, nickel, chromium, iron, and vanadium. In particular, a lithium-nickel composite oxide expressed by a general formula $Li_xNi_yM_{1-y}O_2$ ($0.95 \leq x \leq 1.10$, M is at least one of Co, Mn, Cr, Fe, Mg, Ti, and Al, and $0.6 \leq y \leq 0.95$) is preferably used.

The negative plate according to the present invention may be obtained by forming negative electrode active material layers on a negative electrode current collector. The material of the negative electrode current collector may be, for example, copper, a copper alloy, nickel, a nickel alloy, a stainless steel, aluminum, or an aluminum alloy. In particular, copper, a copper alloy, nickel, or a nickel alloy is preferably used since electrochemical elusion or the like does not easily occur in such a case.

The negative electrode active material may be a carbon material capable of reversibly occluding and releasing lithium ions such as natural graphite, spherical or fibrous artificial graphite, non-graphitizable carbon (hard carbon), or graphitizable carbon (soft carbon), a metal oxide material such as stannic oxide or silicon oxide, silicon, or a silicon-containing compound such as silicide.

The separator may be formed of a microporous film made of a polyolefin material, and is preferably formed of a combination of a polyolefin material and a heat resistant material. The polyolefin may be, for example, polyethylene, polypropylene, or ethylene-propylene copolymer. These resins may be used individually, or in combination of two or more thereof. The heat resistant material may be, for example, a heat resistant resin such as aramid, polyimide, or polyamide-imide, or a mixture of a heat resistant resin and an inorganic filler.

The non-aqueous electrolyte is prepared by dissolving a lithium salt into a non-aqueous solvent. The non-aqueous solvent may be, for example, a cyclic carbonate such as ethylene carbonate, propylene carbonate, or butylene carbonate, or a chain carbonate such as dimethyl carbonate, diethyl carbonate, or ethyl methyl carbonate, which may be used individually or as a mixture of two or more thereof. The lithium salt may be, for example, a highly electrophilic lithium salt, such as $LiPF_6$, $LiBF_4$, or $LiClO_4$, which may be used individually or as a mixture of two or more thereof. A known additive, such as vinylene carbonate, may be added to the non-aqueous electrolyte.

INDUSTRIAL APPLICABILITY

As described above, the present invention provides a sealed battery with which gas can be vented while leakage of the gas or electrolyte through a side wall of an outer can is suppressed. In this respect, the present invention has a great industrial significance.

REFERENCE SIGNS LIST 1 positive plate
2 negative plate
3 separator
4 wound electrode group
5 outer can
5a grooved portion
6 upper insulating plate
7 lower insulating plate
8 positive electrode lead
9 negative electrode lead
10 sealing body
10a thin portion
10b welded portion
101 first plate-shaped member
101a step portion
102 second plate-shaped member
102a step portion
11 insulating gasket
21 valve cap
21a vent hole
22 PTC thermistor
23 explosion prevention valve
23a rupture groove
24 insulating plate
25 explosion prevention valve
25a rupture groove
26 terminal plate
26a vent hole

The invention claimed is:

1. A sealed battery comprising a bottomed cylindrical outer can having an opening, the opening and a sealing body being crimp-sealed with an insulating gasket interposed therebetween, the insulating gasket and a first plate-shaped member together seal an interior of the bottomed cylindrical outer can, wherein the sealing body includes a first plate-shaped member made of aluminum or an aluminum alloy and a second plate-shaped member made of a material harder than the first plate-shaped member and bonded to a surface of the first plate-shaped member, the surface facing the outside of the battery, wherein at least the first plate-shaped member is crimp-sealed at an outer periphery thereof, and the crimp-sealed plate-shaped member has a thin portion on at least one surface thereof, the thin portion serving as a starting point of deformation of the sealing body when a battery internal pressure increases, and wherein, when the battery internal pressure increases, the sealing body is deformed so that a gap is formed between the insulating gasket and the sealing body and gas in the outer can is vented to the outside of the outer can.

2. The sealed battery according to claim 1,
wherein the second plate-shaped member is formed of a stainless steel plate or a nickel-plated steel plate.

3. The sealed battery according to claim 1,
wherein the outer can includes a side wall having a grooved portion that projects toward a battery axis, and
wherein the thin portion is provided in a region on the inner side of the grooved portion.

4. The sealed battery according to claim 1,
wherein an entirety of the sealing body is located below a top surface of the outer can.

5. The sealed battery according to claim 1,
wherein, when the battery internal pressure further increases, the sealing body is completely released from the outer can.

6. The sealed battery according to claim 1,
wherein the sealed battery is a lithium-ion secondary battery including a positive plate,
wherein the positive plate includes a lithium-nickel composite oxide as a positive electrode active material, the lithium-nickel composite oxide being expressed by a general formula $Li_xNi_yM_{1-y}O_2$ ($0.95 \leq x \leq 1.10$, M is at least one of Co, Mn, Cr, Fe, Mg, Ti, and Al, and $0.6 \leq y \leq 0.95$), and
wherein the sealed battery has a volume energy density of 500 Wh/L or more.

7. The sealed battery according to claim 1,
wherein the insulating gasket and the first plate-shaped member together sealing the interior of the bottomed cylindrical outer can is configured to cause the thin portion to serve as the starting point of deformation of the sealing body when the battery internal pressure increases.

* * * * *